United States Patent
Hu et al.

(10) Patent No.: US 6,408,093 B1
(45) Date of Patent: Jun. 18, 2002

(54) METHOD FOR COMPARING OBJECT RANKING SCHEMES

(75) Inventors: Jianying Hu, Cranford; Ramanujan S. Kashi, Bridgewater; Gordon Thomas Wilfong, Gillette, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/391,712

(22) Filed: Sep. 8, 1999

(51) Int. Cl.$^7$ .............................. G06K 9/68; G06K 9/62; G06F 7/00

(52) U.S. Cl. ........................... 382/219; 382/228; 707/5; 707/6

(58) Field of Search .................................. 382/218, 219, 382/224, 225, 226, 227, 228; 707/3, 5, 6, 7

(56) References Cited

U.S. PATENT DOCUMENTS

| | | | | | |
|---|---|---|---|---|---|
| 5,991,755 | A | * | 11/1999 | Noguchi et al. | ................ 707/3 |
| 6,012,056 | A | * | 1/2000 | Menlove | ........................ 707/5 |
| 6,104,835 | A | * | 8/2000 | Han | .......................... 382/225 |
| 2001/0013035 | A1 | * | 8/2001 | Cohen | ........................... 707/5 |

OTHER PUBLICATIONS

Tim Kam Ho, "Decision Combination in Mutiple Classifier Systems", Jan. 1994, IEEE ISBN: 0162–8828, vol. 16, No. 1, pp. 66–75.*

Kim et al, "A Systematic Approach to Classifier Selection on Combining Multiple Classifiers for Handwritten Digit Recognition", 1997, IEEE ISBN: 0–8186–7898–4, pp. 459–462.*

Tubbs et al, "Measures of Confidence Associated with Combining Classification results", IEEE ISBN: 0018–9472, May/Jun. 1991, vol. 21, No. 3, pp. 690–692.*

Henry S. Baird, "Background Structure In Document Images", International Journal of Pattern Recognition and Artificial Intelligenc vol. 8, No. 5 (1994) 1013–1030.

Wei Zhu, "Image Organization and Retrieval using a Flexible Shape Model", pp. 31–39.

Andreas Dengel and Gerhard Barth, "High Level Document Analysis Guided by Geometric Aspects", International Journal of Pattern Recognition and Artificial Intelligenece vol. 2 No. 4 (1988) 641–655 (1988).

Hanno Walischewski, "Automatic Knowledge Acquisition for Spatial Document Interpretation", pp. 243–247 1997 IEEE.

David Doermann, Huiping Li and Omid Kia, "The Detection of Duplicates in Document Image Databases", pp. 314–318 1997 IEEE.

Jonathan J. Hull and John F. Cullen, "Document Image Similarity and Equivalence Detection", pp. 308–312 1977 IEEE.

R.S. Kashi, J. Hu, W.L. Nelson, "On–line Handwritten Signature Verification using Hidden Markov Model Features".

(List continued on next page.)

*Primary Examiner*—Amelia M. Au
*Assistant Examiner*—Mehrdad Dastouri

(57) ABSTRACT

A method for comparing a ranking scheme for an object, such as a document image, with a known standard, or ideal ranking scheme for a comparative assessment of the performance and reliability of the two ranking schemes, is taught. The same set of objects are processed and ranked by both ranking schemes. The ranking scheme being tested is examined for all subject objects ranked lower than its ranking by the ideal ranking scheme. The test ranking scheme is charged for each swapped object which it ranked higher than the subject object, which the ideal ranking scheme ranked lower.

3 Claims, 2 Drawing Sheets

OTHER PUBLICATIONS

Douglas E. Critchlow, "Metric Methods for Analyzing Partially Ranked Data," in 34 Lecture Notes in Statistics (D. Brillinger, et al eds. 1985).

Jianying Hu, Michael K. Brown, and William Turin, "HMM Based On–Line Handwriting Recognition", IEEE Transactions on Patern Analysis and Machine Intelligence, vol. 18, No. 10, Oct. 1996.

John D. Ferguson, "Variable Duration Models for Speech" pp. 143–147.

Hiroaki Sakoe and Seibi Chiba, "Dynamic Programming Algorithm Optimization for Spoken Word Recognition", IEEE Transactions on Acoustics, Speech and Signal Processing vol. ASSP–26, No. 1 pp. 43–49 (1978).

S.E. Levinson, "Continuously variable duration hidden Markov models for automatic speech recognition", Computer Speech and Language pp. 29–45 (1986).

* cited by examiner

METHOD FOR COMPARING OBJECT RANKING SCHEMES

FIELD OF THE INVENTION

The present invention relates generally a method for comparing a scheme for ranking the similarity of a set of objects to a standard object, to a standard ranking scheme. One specific application is taught whereby a document image ranking scheme can be compared with a given standard ranking scheme.

BACKGROUND OF THE INVENTION

There are many applications where document images are processed to determine their similarity with other document images, or models of document image types. These include classifying groups of similar document images. Document type classification is used in a variety of applications including database management and document routing through a computer network. Furthermore, by identifying the class to which a document image belongs, one can expect certain information contained in the document to appear in selected regions of the document. Thus, once a document type is identified, data may be relatively easily extracted from the document by focusing on that specific region.

Due to the demand, various schemes have been developed and are known, for ranking document images by their degree of closeness to a set standard document image. Furthermore, over time and experience with a particular scheme, those skilled in the art become familiar with what they can expect from that scheme in terms of reliability and performance. However, there is no objective method for measuring the comparative performance of one ranking scheme to another for a particular application.

Similarly, ranking schemes are used in a variety of applications, not only document images. Indeed a ranking scheme can be used whenever it is desired to order the relative similarity of multiple objects to a standard object. An object herein refers to any item that can be compared with a given standard, including, but not limited to a document, text file, or image file. However, there is no known objective method for comparing the various schemes for ranking the relative similarity of the various objects to the standard.

SUMMARY OF THE INVENTION

In accordance with the present invention an object ranking scheme is compared with a known standard, or ideal ranking scheme for a comparative assessment of the performance and reliability of the ranking scheme being tested as compared with the ideal ranking scheme. The same set of objects are processed and ranked by both ranking schemes. A higher ranking indicates a relatively closer similarity to a standard object than a lower ranked object.

The ranking scheme being tested is examined for all objects of interest. Referring to each of those objects as subject objects, the test ranking scheme is charged for each object, referred to herein as a swapped object, which it ranked higher than a subject object, which the ideal ranking scheme ranked lower than the subject object. In one specific embodiment of the present invention the objects are document images.

DETAILED DESCRIPTION OF THE INVENTION

The present invention is described herein as applied in a specific embodiment. Namely comparing ranking schemes of document images. The subject invention, however, applies equally to any object type that is compared with a given standard for that object and based on that comparison ranked to reflect the relative distance between the object and the standard against which it is compared.

Figure 1:
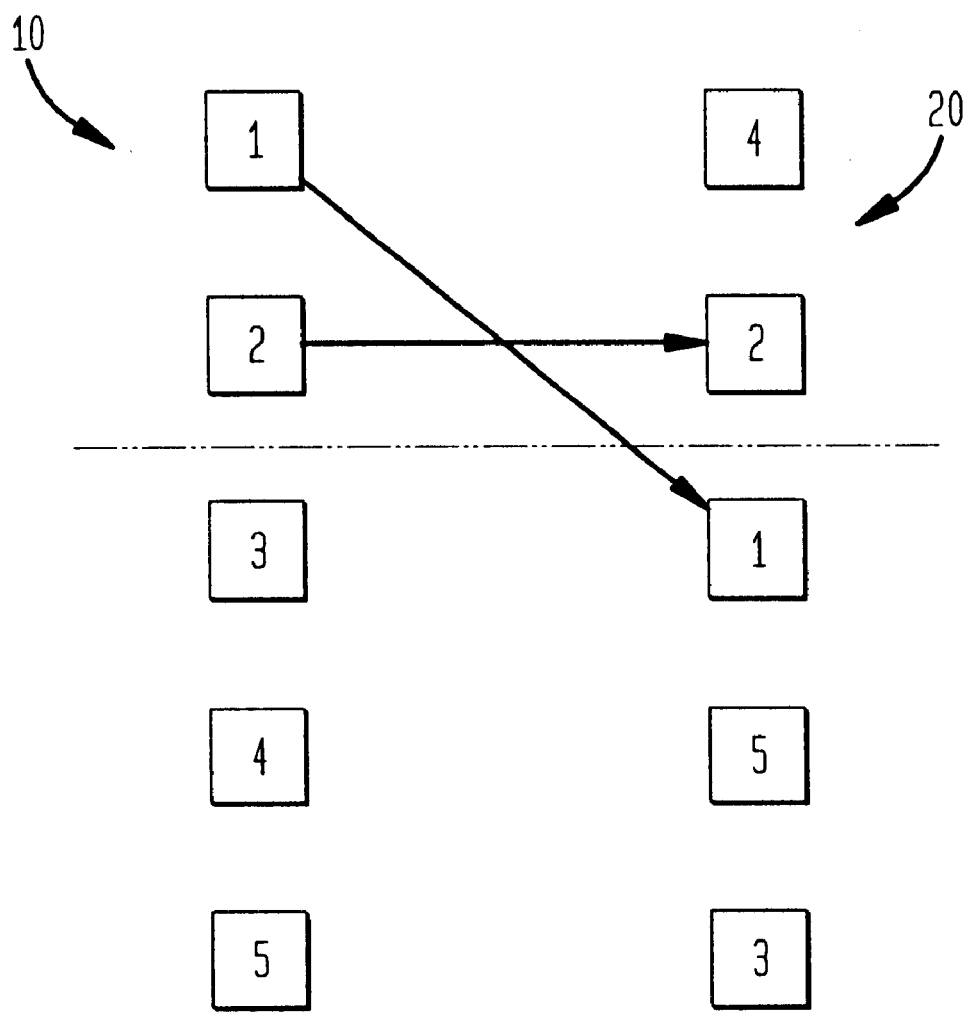
FIG. 1 illustrates two ranking lists of document images.

Referring to FIG. 1, two lists of ranked document images are shown. The left list 10 reflects a ranking of 1–5 by a ranking scheme selected as the basis against which to compare other ranking schemes. Each ranking scheme is a process by which a series of documents are compared with a standard and a measure of similitude between the test document and the standard is obtained. This measure of similitude is referred to herein as a distance measure. The smaller the distance measure, the higher the ranking. For the case of FIG. 1, 1 is the highest rank and 5 is the lowest rank.

The "ideal" ranking scheme can be selected based on any desirable criteria. It may be known to provide good distance measurements. It may simply be a known scheme against which a second scheme whose results are unknown, can be compared. It may even be known that one ranking scheme provides a better measure than the other, but it is desired to measure the degree to which the two schemes are different.

Figure 2:
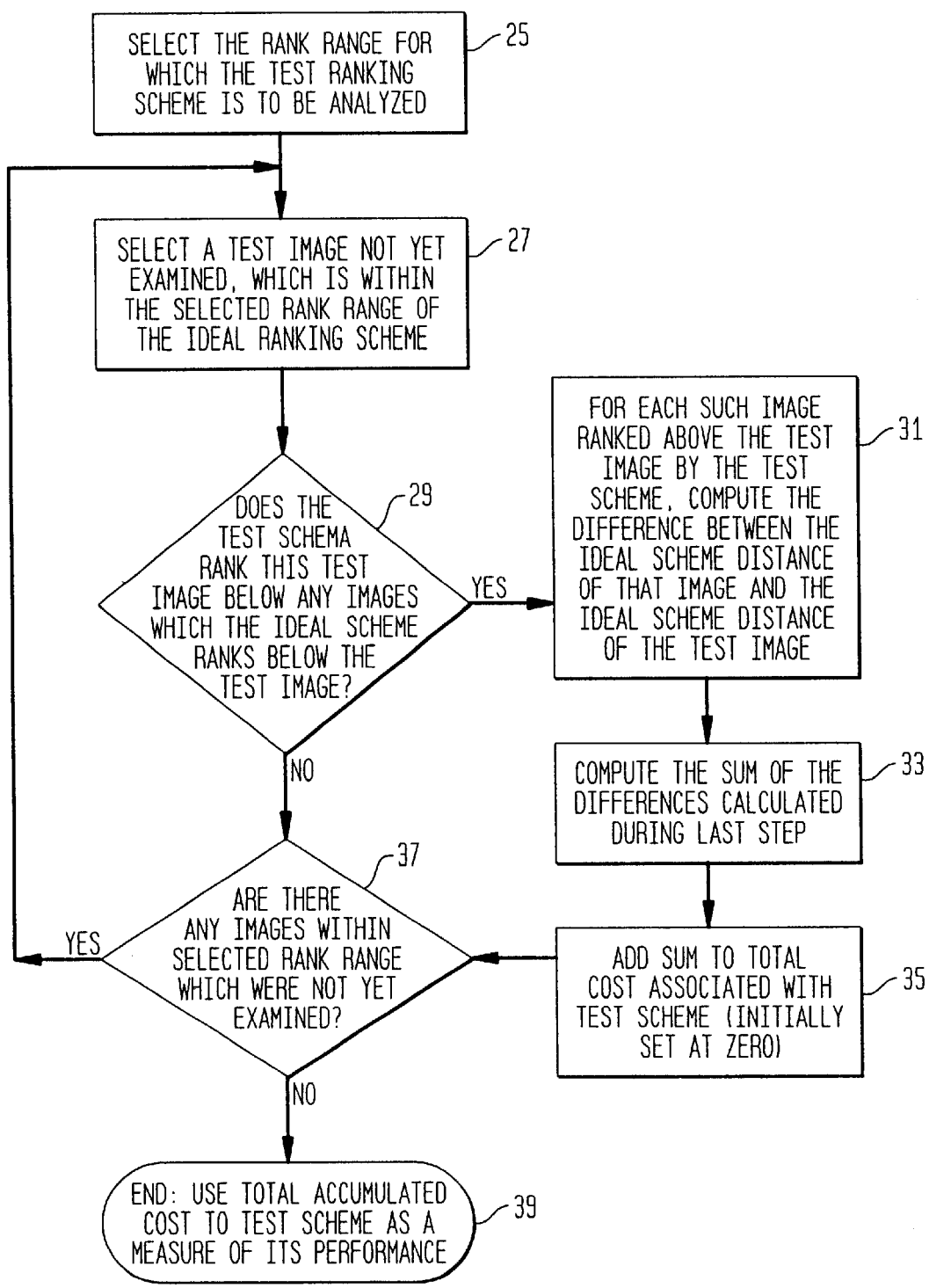
FIG. 2 is a flow chart of one embodiment of the present invention.

Referring now to FIGS. 1 and 2, the method of the present invention is described. Initially, one must select the extent to which the comparative value of the second ranking scheme is of interest, block 25. The dashed line in FIG. 1 indicates an interest in the two highest ranking document images. Clearly, one's interest may extend anywhere from the highest ranking document image through the lowest ranking document image. As described below, in all instances the approach to the comparative process is the same, it is simply extended further down the rank list.

Thus in accordance with the present invention the process begins by examining how the second rank scheme ranked document images 1 and 2, block 27. While the order of examination of document images 1 and 2 is of no consequence, for ease of discussion we begin with document 1. The query to be answered is whether the second rank scheme ranked document image 1 lower than any other document image that had been ranked below document image 1 by the ideal rank scheme, block 29. Since document image 1 by definition is the ideal highest ranking document image, list 20 should not have any document images ranked higher than document 1. Since list 20 indicates that document image 2 was ranked higher than document image 1, a cost is attributed to the second ranking scheme. The cost is calculated as the difference between the distance of document 2 from the standard document image and the distance of document image 1 from the standard document image, block 31.

In addition to document image 2, document image 4 was also ranked higher than document image 1 by the second ranking scheme. Consequently, it must be charged as well for the difference between the distance of document image 4 from the standard document image and document image 1 from the standard document image.

At this point we have completed the comparative analysis with respect to the document image which the ideal ranking scheme ranked as highest. If we were only concerned with the comparative performance of the two ranking schemes with respect to the highest ranking document image we would stop here. The evaluation measurement for the second ranking scheme would be the sum of the differences in distances computed above.

However, as stated above, for this particular example we are interested in the two highest ranking document images. Therefore we proceed with the same steps as we took in connection with document image 1. This is shown by the loop from block 37 to block 27. Accordingly, we locate where on list 20 document image 2 was ranked. Based on the ideal ranking scheme we would hope to find no documents other than document image 1, ranked above document image 2. However, list 20 shows document image 4 with a higher rank than document image 2. Consequently, the second ranking scheme should be charged in the same fashion as described above. Thus the complete comparative evaluation of the second ranking scheme with respect to the two highest ranked document images is (D2—D1)+(D4−D1)+(D4−D2), where D denotes the distance measurement of the respective document image by the ideal ranking scheme to the standard document image.

If the comparative analysis were extended to document image 3, we would find document image 3 on the bottom of list 20. Since document images 1 and 2 are ranked higher than document image 3 by the ideal ranking scheme, there is no cost to the second ranking scheme for ranking document image 3 below document images 1 and 2. However, the second ranking scheme must be charged, in the same manner as described above in detail, for ranking document images 4 and 5 above document image 3.

The foregoing merely illustrates the principles of the present invention. Those skilled in the art will be able to devise various modifications, which although not explicitly described or shown herein, embody the principles of the invention and are thus within its spirit and scope.

What is claimed is:

1. A method for comparing the performance of a test scheme for ranking a plurality of objects with an arbitrarily selected ideal ranking scheme, wherein a rank of an object is a measure of the similarity of said object to an object standard relative to said plurality of objects, said method comprising the steps of:

identifying all subject objects, each of said subject objects having a rank by said ideal ranking scheme which indicates a measure of similarity between said subject object and said standard object;

for each of said subject objects, identifying all swapped objects, said swapped objects being ranked higher than said subject object by said test scheme and lower than said subject object by said ideal ranking scheme;

computing for each of said swapped objects the difference between the distance of said subject object from said standard object, as measured by said ideal ranking scheme and the distance of said swapped object from said standard object; and computing the sum of said computed differences, said sum reflecting the performance of said test scheme for ranking said plurality of objects as compared with said ideal ranking scheme.

2. The method of claim 1 wherein said object is a document image.

3. A computer implemented system for comparing the performance of a test scheme for ranking a plurality of objects with an arbitrarily selected ideal ranking scheme, wherein a rank of an object is a measure of the similarity of said object to an object standard relative to said plurality of objects, comprising:

computer software implemented means for identifying all subject objects, each of said subject objects having a rank by said ideal ranking scheme which indicates a measure of similarity between said subject object and said standard object;

computer implemented software for identifying all swapped objects, said swapped objects being ranked higher than one of said subject objects by said test scheme and lower than said subject object by said ideal ranking scheme; and computer implemented software means for computing the sum of the differences between the distance of said subject objects from said standard object, as measured by said ideal ranking scheme and the distance of said swapped objects from said standard object.

* * * * *